United States Patent
Fujita et al.

(10) Patent No.: US 6,808,821 B2
(45) Date of Patent: Oct. 26, 2004

(54) UNSATURATED POLYESTER RESIN COMPOSITION

(75) Inventors: Yukiko Fujita, Sakai (JP); Takashi Tomiyama, Kaizuka (JP); Shigeru Motomiya, Sennan-gun (JP)

(73) Assignee: Dainippon Ink and Chemicals, Inc., Tokyo (JP)

(*) Notice: Subject to any disclaimer, the term of this patent is extended or adjusted under 35 U.S.C. 154(b) by 0 days.

(21) Appl. No.: 10/363,054

(22) PCT Filed: Sep. 5, 2001

(86) PCT No.: PCT/JP01/07687

§ 371 (c)(1),
(2), (4) Date: Aug. 13, 2003

(87) PCT Pub. No.: WO02/20633

PCT Pub. Date: Mar. 14, 2002

(65) Prior Publication Data

US 2004/0024140 A1 Feb. 5, 2004

(51) Int. Cl.[7] .................. B32B 27/36; C08G 63/18; C08F 20/00
(52) U.S. Cl. .................. 428/482; 528/302; 528/306; 528/307; 528/308; 525/445
(58) Field of Search ................. 528/302, 303, 528/306, 307, 308; 428/482; 525/445

(56) References Cited

U.S. PATENT DOCUMENTS 6,268,464 B1    7/2001   Keinänen et al.

FOREIGN PATENT DOCUMENTS

| EP | 0 400 884 | 12/1990 |
|---|---|---|
| JP | 56-145960 | 11/1981 |
| JP | 56-152877 | 11/1981 |
| JP | 2-281019 | 11/1990 |
| JP | 6-55549 | 3/1994 |
| JP | 7-157645 | 6/1995 |
| JP | 8-188628 | 7/1996 |
| JP | 11-21439 | 1/1999 |
| JP | 11-240924 | 9/1999 |
| JP | 11-268217 | 10/1999 |

*Primary Examiner*—Samuel A. Acquah
(74) *Attorney, Agent, or Firm*—Armstrong, Kratz, Quintos, Hanson & Brooks, LLP

(57) ABSTRACT

Disclosed is an unsaturated polyester resin composition comprising an unsaturated polyester (A) and a polymerizable unsaturated monomer (B), wherein the "shrinkage stress upon cooling" of a cured article thereof is 17 MPa or less and the ratio of the "shrinkage stress upon cooling/elastic limit" is 1 or less. The cured article has excellent gloss retention and yellowing resistance.

7 Claims, No Drawings

UNSATURATED POLYESTER RESIN COMPOSITION

TECHNICAL FIELD

The present invention relates to an unsaturated polyester resin capable of forming a cured article having excellent gloss retention and yellowing resistance, a coating material and a gel coating material which use the same, and a fiber reinforced plastic (FRP) molded article using the same on the surface.

BACKGROUND ART

Unsaturated polyester resins are used in various FRP molded articles, coating compositions and gel coating materials because of their excellent chemical, physical, mechanical and electrical characteristics such as their wide curing temperature conditions and rapid curing rate. However, conventional unsaturated polyester resins have drawbacks in that not only is the gloss drastically lowered, but also yellowing occurs when exposed outdoors for a long period because of poor weathering resistance. To solve the drawback, Japanese Unexamined Patent Application, First Publication No. Hei 7-157645 suggests an unsaturated polyester resin composition derived from an acid component comprising an alicyclic saturated acid and an aliphatic unsaturated acid, and an alcohol component selected from aliphatic alcohol and alicyclic alcohol, while First Publication No. Hei 9-263692 suggests an unsaturated polyester resin composition derived from an acid component comprising hexahydrophthalic anhydride and an unsaturated dibasic acid and a polyhydric alcohol component. Although the yellowing resistance of these unsaturated polyester resin compositions is improved, the gloss retention is not improved.

EP-A-0400884 suggests an unsaturated polyester resin composition using 2-methyl-1,3-propanediol as an alcohol component. U.S. Pat. No. 6,268,464 suggests an unsaturated polyester resin composition obtained from 30 to 70 mol % of at least two diols, 0.5 to 8 mol % of 2-butyl-2-ethyl-1,3-propanediol, an aromatic carboxylic acid and other two carboxylic acids. In these inventions, only the yellowing resistance is improved, and the gloss retention is poor.

In these prior arts, although the yellowing resistance was improved by an improvement in the composition of the raw materials, gloss retention is insufficient and, thereby causing chalking, and lowering of the gloss within a comparatively short time. Therefore, these prior arts do not satisfy both yellowing resistance and gloss retention which are factors of the weathering resistance.

The regulation of the release of a styrene monomer into the atmosphere has recently become more strict in view of environmental problems; therefore, resins which experience low styrene vaporization and have a low styrene content have been required. As a method of preparing an unsaturated polyester resin which experiences low styrene vaporization and has a low styrene content, a method of reducing the styrene content using a CPD unsaturated polyester having a low molecular weight and a method of adding paraffin wax are known. According to these methods, the weathering resistance cannot be satisfied, although the vaporization amount and content of the styrene monomer can be reduced.

An object of the present invention is to provide an unsaturated polyester resin composition wherein both the gloss retention and the yellowing resistance in a weathering test have been improved, a coating material using the same, and a molded article thereof.

DISCLOSURE OF INVENTION

To solve the problems described above, the present inventors have made intensive studies about unsaturated polyester resin compositions and found that an unsaturated polyester resin composition which has excellent gloss retention and yellowing resistance (e.g., a gloss retention of 60% or more and a color difference of 20 or less) and which also has a small content of a polymerizable unsaturated monomer can be obtained when an unsaturated polyester resin composition is prepared such that the "shrinkage stress upon cooling" is 17 MPa or less and the ratio of the "shrinkage stress upon cooling/elastic limit" is 1 or less in a cured article of the unsaturated polyester resin composition when the temperature is reduced from 70° C. to 20° C. Thus, the present invention has been completed.

The present invention provides an unsaturated polyester resin composition comprising an unsaturated polyester (A) and a polymerizable unsaturated monomer (B), wherein the "shrinkage stress upon cooling" of a cured article thereof is 17 MPa or less and the ratio of "shrinkage stress upon cooling/elastic limit" is 1 or less. The present invention also provides a coating material and a gel coating material which use the unsaturated polyester resin composition, and a fiber reinforced plastic molded article.

BEST MODE FOR CARRYING OUT THE INVENTION

Prior to a detailed description of the present invention, definitions of the technical terms used herein will be described below.

Shrinkage Stress Upon Cooling

The technical term "Shrinkage stress upon cooling" used herein refers to a "shrinkage stress" produced when a cured article of an unsaturated polyester resin composition is cooled from 70° C. to 20° C., and is measured by the following measuring method.

<Measuring Method>

(i) To the unsaturated polyester resin composition of the present invention, 1.0% of 55% methyl ethyl ketone peroxide (curing agent) and 0.1% of 6% cobalt naphthenate (curing accelerator) are added, followed by stirring. Then, the mixture is adjusted with t-butyl catechol so that a gel time as measured in accordance with a JIS K6901 gelation time at a normal temperature of 25° C. (A method) is 30 minutes. The degassed resin composition is applied to a glass plate so that the resulting film has a thickness of 0.3 mm, and the top surface is covered with a 150 μm polyethylene terephthalate film. After standing at room temperature for 24 hours, a cured film is made.

(ii) Test pieces having a size of 70 mm×10 mm×0.3 mm are made from the resulting cured film. The glass transition temperature (Tg) of the test piece is measured by a transition temperature measuring apparatus ("DMS600", manufactured by Seiko Instruments Inc.).

(iii) This test specimen is fixed to a tensile testing machine ("Tensilon RTM-100PL", manufactured by ORIENTEC Co., Ltd.). The temperature in a thermostatic chamber provided with a test piece fixing portion is set to a temperature which is 10° C. higher than Tg of the test piece, and the test piece is maintained at the setting temperature for 10 minutes.

(iv) Since the test piece elongates, the test piece is fixed again after increasing the length of the sample only by the length corresponding to the elongation. While reducing the temperature in the thermostatic chamber containing the test piece at a cooling rate of 5° C./min, the elongation is converted into a value per unit area (e.g., 1 mm). The difference between the stress at 70° C. in the thermostatic chamber and the stress at 20° C. is taken as the "shrinkage stress upon cooling".

Elastic Limit

The technical term "elastic limit" used herein means an elastic limit measured by the following measuring method.
<Measuring Method>
(i) A cured film obtained by the very same method as in the case of (i) in the previous measurement of the "shrinkage stress upon cooling" is further cured by allowing to stand in a thermostatic chamber at 60° C. for 30 minutes.
(ii) Test pieces having a size of 70 mm×10 mm×0.3 mm are made from the resulting cured film.
(iii) This test specimen is fixed to a tensile testing machine ("Tensilon RTM-100PL", manufactured by ORIENTEC Co., Ltd.) and measured at a normal temperature (25° C.) at a testing rate of 5 mm/min. In the initial stage of the stress-strain curve, the maximum stress in the linear region is determined, and the maximum stress is taken as the "elastic limit".

The value of the ratio of the "shrinkage stress upon cooling/elastic limit" is obtained by dividing the value of the "shrinkage stress upon cooling" by the value of the "elastic limit".

Gloss Retention

The technical term "gloss retention" used herein means gloss retention of a 2,000-hour weathering test measured by the following measuring method.
<Measuring Method>
(i) To the unsaturated polyester resin composition, 1.0% of 55% methyl ethyl ketone peroxide and 0.1% of 6% cobalt naphthenate are added, followed by stirring and degassing. The resin composition is poured onto a sealed glass plate having a spacer for controlling the thickness to 3 mm, which is coated with a releasant, allowed to stand at a normal temperature for 24 hours and then cured at 120° C. for 120 minutes to obtain a cast plate having a thickness of about 3 mm.
(ii) Weathering test pieces having a size of 75 mm×70 mm are made from the cast plate thus obtained. Using a Sunshine weatherometer based on ISO standards (ISO 4892-4: 1994, a test method in accordance with an open flame carbon arc lamp), these test specimens are subjected to an accelerated weathering test for 2,000 hours.
(iii) The specular gloss of the surface (test surface) of the test pieces tested after 2,000 hours is measured at an incidence angle of 60 degrees by a method based on JIS Z8741-1997 (ISO 2813: 1994), and the gloss retention is determined by the following equation based on the value of the specular gloss.

Gloss retention (%)=(specular gloss after test/specular gloss before test)×100.

Color Difference

The technical term "color difference" used herein is represented by "ΔE*ab" using the indication method prescribed in JIS Z8730-1995, and represents the degree of yellowing of a 2,000-hour weathering test measured by the following method.
<Measuring Method>
(i) Using the same test specimen having a thickness of 3 mm as that used in the measurement of the gloss retention in the accelerated weathering test, a measurement was carried out. The object color of the surface of the test piece was measured by the method prescribed in JIS Z8722 and the "color difference" according to the L*a*b* colorimetric system is calculated by the following equation:

$$\Delta E^*ab=[(\Delta L^*)^2+(\Delta a^*)^2+(\Delta b^*)^2]^{1/2} \quad \text{Equation 2}$$

(ii) ΔE*ab denotes a color difference due to the L*a*b* calorimetric system prescribed in JIS Z8279, ΔL* denotes a difference in the CIE 1976 brightness L* between two object colors, and Δa* and Δb* each denotes a difference of color coordinates, in the L*a*b* calorimetric system.
(iii) Since the test piece is transparent, the measurement is carried out in a state where the surface opposite the measuring surface is provided with a white plate which cannot transmit light. Since the color difference largely depends on the film thickness in this measurement, it is necessary to correct the film thickness by LAMBERT's rule for the case of comparing with a test piece having a thickness other than 3 mm. The higher the ΔE value, the more severe the discoloration, such as yellowing.

The unsaturated polyester (A) used in the present invention is derived from a dibasic acid component and a polyhydric alcohol component. As the preferred dibasic acid component (1), an alicyclic saturated dibasic acid and an aliphatic unsaturated dibasic acid are used in combination. As the polyhydric alcohol component (2), a symmetric glycol (a) and at least one glycol (b) selected from a glycol having no side chain and an asymmetric glycol having a side chain are used in combination.

Preferred examples of the alicyclic saturated dibasic acid include hexahydrophthalic anhydride, hexahydrophthalic acid, 1,4-cyclohexanedicarboxylic acid, 1,3-cyclohexanedicarboxylic acid, methylhexahydrophthalic acid, Het acid, and 1,1-cyclobutanedicarboxylic acid. These compounds may be used alone or in combination.

Preferred examples of the aliphatic unsaturated dibasic acid used in the present invention include β,γ-unsaturated dibasic acid, for example, α,β-unsaturated dibasic acid or dihydromuconic acid, such as maleic acid, maleic anhydride, fumaric acid, itaconic acid, citraconic acid, or aconitic acid. These compounds may be used alone or in combination. Among these compounds, maleic acid, maleic anhydride and fumaric acid are particularly preferred.

In addition to the dibasic acid component described above, an aliphatic saturated dibasic acid, an aromatic saturated dibasic acid, and other dibasic acids may be used in combination in the amount of 20 mol % based on the total amount of the acid component as long as the effects of the present invention are not impaired. Examples of the aliphatic saturated dibasic acid include oxalic acid, malonic acid, succinic acid, adipic acid, sebacic acid, azelaic acid, glutaric acid, pimelic acid, suberic acid, and dodecanoic diacid.

Examples of the aromatic saturated dibasic acid include phthalic anhydride, isophthalic acid, terephthalic acid, trimellitic acid, and pyromellitic acid. These compounds may be used alone or in combination. In the present invention, it is preferable that aromatic acid components such as aromatic monobasic acid, aromatic saturated dibasic acid and an anhydride thereof are not used in combination, but may be used in combination as long as the desired color difference of the weathering resistance of the present invention is satisfied. When using aromatic acid components in combination, the viscosity of the resin is preferably reduced by combining an aliphatic dibasic acid, such as adipic acid.

The polyhydric alcohol component (2) used in the present invention is preferably made of a combination of a symmetric glycol (a) selected from an aliphatic glycol, and an alicyclic glycol and at least one glycol (b) selected from a glycol having no side chain and an asymmetric glycol having a side chain.

Examples of the symmetric glycol (a) used in the present invention include neopentyl glycol, hydrogenated bisphenol A, hydrogenated bisphenol F, 2,2-diethyl-1,3-propanediol, 1,4-cyclohexane dimethanol, and 1,4-cyclohexanediol. Among these compounds, neopentyl glycol is preferred.

Preferred examples of the glycol having no side chain (b) include those having a hydroxyl group at both terminals wherein the number of carbon atoms of the straight-chain portion is 2 or more. More preferred examples thereof include straight-chain glycols having a hydroxyl group at both terminals, wherein the number of carbon atoms of the straight-chain portion is from 3 to 10, such as ethylene glycol, diethylene glycol, triethylene glycol, tetraethylene glycol, 1,3-propylene glycol, dipropylene glycol, 1,4-butanediol, 1,5-pentanediol, 1,6-hexanediol, 1,7-heptanediol, 1,8-octanediol, 1,9-nonanediol, and 1,10-decanediol.

The asymmetric glycol (b) is preferably a glycol which has a principal chain having an odd number of carbon atoms and one short-chain alkyl group as a side chain or two different short-chain alkyl groups, the glycol being capable of reducing the viscosity of the resin, and examples thereof include 2-butyl -2-ethyl-1,3-propanediol, 2-methyl-1,4-butanediol, 2-ethyl -1,4-butanediol, 2-methyl-1,3-propanediol, 3-methyl-1,5-pentanediol, and 3-methyl-1,5-heptanediol.

In addition to the above polyhydric alcohol component, other polyhydric alcohol components can be used in combination as long as the effects of the present invention are not impaired. Examples of the polyhydric alcohol component (2) which can be used in combination include an adduct with an alkylene oxide, such as ethylene oxide, propylene oxide or butylene oxide of hydrogenated bisphenol A; a dihydric alcohol such as ethylene glycol carbonate; a trihydric alcohol such as glycerin or trimethylolpropane; and a tetrahydric alcohol such as pentaerythritol. The amount of these polyhydric alcohol components is preferably 10 mol % or less based on the total amount of the polyhydric alcohol. To obtain a resin composition having excellent yellowing resistance, aromatic glycol compounds which can cause yellowing, that is, aromatic glycol compounds capable of forming a chromophore by photoreaction, and a glycol having an ether group such as an ether bond wherein the deterioration reaction is liable to proceed due to irradiation with light, are preferably not used.

When using a glycol having an odd number of carbon atoms (e.g., 1,3-propanediol, 2-methyl-1,3-propanediol, 2-butyl-2-ethyl -1,3-propanediol, etc.) as the asymmetric glycol (b), the resin viscosity can be reduced and the content of the polymerizable unsaturated monomer can be reduced, and at the same time, the viscosity of the resulting composition can be reduced.

To block a terminal carboxyl group of the unsaturated polyester (A), a monohydric alcohol such as benzyl alcohol, 2-ethylhexyl alcohol, decyl alcohol, undecyl alcohol, lauryl alcohol, tridecyl alcohol, or stearyl alcohol can be used, for example.

The unsaturated polyester (A) used in the present invention is obtained by a condensation reaction by a known method of the dibasic acid component (1) and the polyhydric alcohol component (2) which are described above as preferred examples. The molar ratio of the dibasic acid component (1) to the polyhydric alcohol component (2) is preferably (1)/(2)=0.9 to 1.3.

Formulation examples of the preferred unsaturated polyester (A) used in the present invention include the following Formulation Examples.

Formulation Example 1

Dibasic acid component (1): composed of 30 to 65 mol % of an alicyclic saturated dibasic acid, and 35 to 70 mol % of an aliphatic unsaturated dibasic acid.

Polyhydric alcohol component (2): composed of 60 to 80 mol % of a symmetric glycol (a), and 20 to 40 mol % of a glycol having no side chain (b).

Formulation Example 2

Dibasic acid component (1): composed of 30 to 65 mol % of an alicyclic saturated dibasic acid, and 35 to 70 mol % of an aliphatic unsaturated dibasic acid.

Polyhydric alcohol component (2): composed of 40 to 80 mol % of a symmetric glycol (a), and 20 to 60 mol % of an asymmetric glycol having a side chain (b).

Formulation Example 3

Dibasic acid component (1): composed of 30 to 65 mol % of an alicyclic saturated dibasic acid, and 35 to 70 mol % of an aliphatic unsaturated dibasic acid.

Polyhydric alcohol component (2): composed of 60 to 80 mol % of a symmetric glycol (a), and 10 to 35 mol % of a glycol having no side chain and 5 to 10 mol % of an asymmetric glycol having a side chain (b).

The unsaturated polyester (A) used in the present invention includes an unsaturated polyester acrylate obtained by reacting a molecular terminal carboxyl group with an unsaturated epoxy compound such as glycidyl ether methacrylate. It also includes a urethane bond-containing polyester acrylate obtained by reacting a molecular terminal hydroxyl group with an unsaturated compound having an isocyanate group and an unsaturated group, and an unsaturated polyester acrylate obtained by reacting a molecular terminal hydroxyl group with an unsaturated monobasic acid or an acid anhydride thereof.

The polymerizable unsaturated monomer (B) used in the present invention is preferably a styrene monomer and/or an acrylic monomer; if necessary, the other unsaturated monomer having one or more polymerizable double bonds in one molecule can be combined. Examples of the styrene monomer include styrene, p-methylstyrene, α-methylstyrene, t-butylstyrene, vinyltoluene, divinylbenzene, chlorostyrene, and dichlorostyrene. These compounds may be used alone or in combination.

Examples of the acrylic monomer and (meth)acrylic monomer include methacrylic acid and esters thereof, such as methyl methacrylate, ethyl methacrylate, butyl methacrylate, isobutyl methacrylate, 2-ethylhexyl methacrylate, lauryl methacrylate, propyl methacrylate, isopropyl methacrylate, 2-hydroxyethyl methacrylate, 2-hydroxypropyl methacrylate, 3-hydroxypropyl methacrylate, cyclohexyl methacrylate, isobornyl methacrylate, dicyclopentenyloxyethyl methacrylate, t-butylcyclohexyl methacrylate, or methacrylic acid; acrylic acid and esters thereof, such as methyl acrylate, ethyl acrylate, butyl acrylate, propyl acrylate, isopropyl acrylate, 2-ethylhexyl acrylate, lauryl acrylate, 2-hydroxyethyl acrylate, cyclohexyl acrylate, isobornyl acrylate, dicyclopentenyloxyethyl acrylate, t-butylcyclohexyl acrylate, or acrylic acid; and (meth)acrylamide, methoxydiethylene glycol (meth)acrylate, methoxytetraethylene glycol (meth)acrylate, methoxypolyethylene glycol (meth)acrylate, β-(meth)acryloyloxyethyl hydrogenphthalate, β-(meth)acryloyloxypropyl hydrogenphthalate, β-(meth)acryloyloxyethyl hydrogensuccinate, nonylphenoxyethyl (meth)acrylate, phenoxydiethylene glycol (meth)acrylate, phenoxypolyethylene glycol (meth)acrylate, methoxytriethylene glycol (meth)acrylate, methoxytriethylene glycol (meth)acrylate, butoxypolyethylene glycol (meth)acrylate, or nonylphenoxyethyl (meth)acrylate. These compounds may be used alone or in combination.

The monomers further include, for example, ethylene glycol di(meth)acrylate, diethylene glycol di(meth)acrylate, triethylene glycol di(meth)acrylate, polyethylene glycol di(meth)acrylate, 1,3-butylene glycol di(meth)acrylate, propylene glycol di(meth)acrylate, 1,4-butylene glycol di(meth) acrylate, polypropylene glycol di(meth)acrylate, 1,6-hexanediol di(meth)acrylate, neopentyl glycol di(meth) acrylate, trimethylolpropane tri(meth)acrylate, trimethylolethane tri(meth)acrylate, tetramethylolmethane tri(meth)acrylate, tetramethylolethane tri(meth)acrylate, tetramethylolmethane tetra(meth)acrylate, 2,2-bis[4-(meth) acryloxyethoxy]phenyl]propane, pentaerythritol tri(meth) acrylate, dipentaerythritol hexa(meth)acrylate, oligoester (meth)acrylate, urethane (meth)acrylate oligomer, (meth) acrylic-modified epoxy oligomer, epoxy-modified acrylic urethane oligomer, and (meth)acrylate oligomer. These compounds may be used alone or in combination.

Examples of the other polymerizable unsaturated monomer used in addition to the polymerizable unsaturated monomer (B) include α,β-unsaturated polybasic acid alkyl ester such as monomethyl fumarate, dimethyl fumarate, monomethyl maleate, dimethyl maleate, monoethyl fumarate, diethyl fumarate, monoethyl maleate, diethyl maleate, monopropyl fumarate, dipropyl fumarate, monopropyl maleate, dipropyl maleate, monobutyl fumarate, dibutyl fumarate, monooctyl fumarate, dioctyl fumarate, monomethyl itaconate, dimethyl itaconate, diethyl itaconate, monoethyl itaconate, monobutyl itaconate, dibutyl itaconate, monopropyl itaconate, or dipropyl itaconate, and diallyl phthalate. These compounds may be used alone or in combination.

The amount of the polymerizable unsaturated monomer (B) used in the present invention may be of any amount as long as the effects of the present invention can be achieved, and is usually 60% by weight or less. For the case when the vaporization is reduced and the yellowing resistance is improved by using a styrene monomer, 60 to 95% by weight of the unsaturated polyester (A) and 5 to 40% by weight of the styrene polymer are preferred as the weight ratio of the styrene monomer as the unsaturated polyester to the polymerizable unsaturated monomer (A)/(B). 70 to 85% by weight of the unsaturated polyester (A) and 30 to 15% by weight of the styrene polymer (B) are more preferred. When each amount is within the above range, a good influence is exerted on the gloss retention of the resin cured article. The ratio of the unsaturated polyester (A) to the polymerizable unsaturated monomer (B) is preferably within a range from 40 to 95: 60 to 5 (% by weight). The mixing ratio of the styrene monomer to the acrylic monomer is preferably within a range from 0 to 50: 50 to 100 (% by weight).

The viscosity of the unsaturated polyester resin composition of the present invention is preferably adjusted within a range from 4.5 to 0.2 Pa·s by incorporating the unsaturated polyester (A) and the polymerizable unsaturated monomer (B).

The number-average molecular weight (Wn) of the unsaturated polyester resin used in the present invention is preferably within a range from 1,200 to 5,000. When the number-average molecular weight is smaller than 1,200, the mechanical strength of the resin cured article is reduced. In contrast, when the number-average molecular weight is larger than 5,000, the viscosity of the unsaturated polyester resin composition is enhanced; therefore, it is preferred.

The glass transition temperature (Tg) of the resin cured article obtained from the polyester resin composition of the present invention is preferably within a range from 5 to 130° C.

To the unsaturated polyester resin composition of the present invention, ultraviolet absorbers and ultraviolet stabilizers can be further added. Examples of the ultraviolet absorber include benzophenone, benzotriazole, and cyano acrylate compounds. Examples of the ultraviolet stabilizer include a hindered amine compound. These compounds may be in any form and may have polymerizable reactivity or esterifiable reactivity, and are appropriately selected and used.

Various organic peroxides as a curing agent may be incorporated into the unsaturated polyester resin composition of the present invention. Examples of the organic peroxide include methyl ethyl ketone peroxide, benzoyl peroxide, acetylacetone peroxide, bis-4-t-butylcyclohexane dicarbonate, and t-butyl-peroxy-2-ethyl hexanate. These compounds may be used alone or in combination.

To the unsaturated polyester resin composition of the present invention, polymerization inhibitors, curing accelerators, dyes, pigments, and waxes such as paraffin can be added optionally. Examples of the polymerization inhibitor include hydroquinone pyrocatechol, and 2,6-t-butyl paracresol. Examples of the curing accelerator include metal soaps such as cobalt naphthenate and cobalt octenate; quaternary ammonium salt such as dimethylbenzylammonium chloride; β-diketone such as acetylacetone; and amines such as dimethylaniline, N-ethyl-metatoluidine and triethanolamine. Furthermore, various additives such as thixotropic agents (e.g., silica powder, asbestos powder, etc.), fillers, stabilizers, defoamers and leveling agents; thermoplastic polymers such as polymethacrylic acid resin (PMMA); and commercially available macromonomers (AA-6 and AA-10, manufactured by TOAGOSEI CO., LTD.) can be incorporated as long as the performance of the gloss retention is not impaired.

The pigment used in the composition of the present invention may be preferably those used for coloration, and examples thereof include titanium white, red iron oxide, condensed azo red, titanium yellow, cobalt blue, quinacridon red, carbon black, iron black, ultramarine green, blue, perinone, Prussian blue, isoindolinone, chrome green, cyanine blue, and green. Those, which are superior in ultraviolet stability and do not inhibit curing of the polyester resin are selected and incorporated according to color tone. These coloring pigments can be dispersed or mixed directly with the polyester resin, or can be added in the form of a color toner prepared by previously kneading with a saturated or unsaturated polyester solid. The amount of the pigment is preferably within a range from 0.1 to 50 parts by weight based on 100 parts by weight of those prepared by dissolving the unsaturated polyester and polymerizable unsaturated monomer.

Examples of the filler used in the composition of the present invention include calcium carbonate, talc, mica, clay, silica powder, colloidal silica, asbestos powder, barium sulfate, aluminum hydroxide, glass powder, alumina powder, silicon dioxide powder, glass beads, and crushed sand. The compositions of the present invention can used as putties, sealing materials and coating materials after incorporating these fillers. They are also suited for use as reinforcing materials by impregnating cloths and kraft papers.

Fiber reinforcers can also be added to the unsaturated polyester resin composition of the present invention. Examples of the reinforcer include glass fibers (e.g., chopped strand mat, glass roving cloth, etc.), carbon fibers, organic fibers (e.g., vinylon, polyester, phenol, etc.), and metal fibers. A fiber reinforced plastic (FRP) can be obtained by adding 10 to 70% by weight of the reinforcer.

A cured article of a conventional unsaturated polyester resin which has a gloss retention (weathering test) of 60% or more and a color difference (ΔE) of 20 or less cannot be obtained. In contrast, the unsaturated polyester resin of the present invention is capable of forming a resin cured article having excellent gloss retention and yellowing resistance by adjusting the "shrinkage stress upon cooling" of the cured article to 17 MPa or less, and preferably to 15 MPa or less, and by dusting the ratio of the "shrinkage stress upon cooling/elastic limit" to 1 or less, and preferably to 0.05 to 0.85. Since the cured article obtained from the resin composition of the present invention has physical properties capable of retarding the photo-deterioration reaction and withstanding a stress produced by a repetitive change in temperature between night and day and due to seasonal variation, the gloss retention after the 2,000-hour weathering test using a Sunshine weatherometer is 60% or more, and preferably 70% or more, and the color difference (ΔE) is 20 or less, preferably 16 or less.

The unsaturated polyester resin composition of the present invention is suited for use in coating materials such as lining materials, coating compositions, and particularly preferably gel coating materials. For the case of mixing with fiber reinforcers and/or fillers, it can be used in molded articles such as SMC and BMC. According to the present invention, it is possible to provide a fiber reinforced plastic molded article obtained by forming a surface layer made of a gel coating material of the unsaturated polyester resin composition of the present invention on a fiber reinforced plastic molded article, which is superior in weathering resistance, yellowing resistance, and surface gloss. Examples of the unsaturated polyester resin composition of the present invention include bathtubs, unit baths, washstands, kitchen utensils, boats, fishing vessels, tanks, panels, vehicle members, housing materials, chairs, desks, and automobile parts.

The coating material of the present invention is obtained by adding curing agents and curing accelerators to the unsaturated polyester resin composition of the present invention, and optionally contain fillers, pigments, waxes, ultraviolet absorbers and ultraviolet stabilizers. The gel coating material of the present invention is obtained by adding curing agents and curing accelerators to the unsaturated polyester resin composition of the present invention, and optionally contains pigments, ultraviolet absorbers, and ultraviolet stabilizers.

The FRP molded article of the present invention is obtained by forming a gel coating layer on the surface of a mold using a gel coating material made of the unsaturated polyester resin composition of the present invention, and by forming a backing layer using a molding material of SMC or BMC according to a known molding method.

The unsaturated polyester resin composition of the present invention can also be used in sealing materials, putties, cast products, and resin concretes. In these cases, additives such as flame retardants may be further added, if necessary.

EXAMPLES

The following Examples further illustrate the present invention in detail, but the present invention is not limited by the Examples. In the following Examples, "parts" are by weight unless otherwise specified.

Example 1

Preparation of Unsaturated Polyester Resin Composition

In a 2-liter four-necked flask equipped with a thermometer, a stirrer, an inert gas introducing inlet, and a reflux condenser, 366 parts of neopentyl glycol, 88 parts of ethylene glycol, 88 parts of 2-butyl-2-ethyl-1,3-propanediol, 462 parts of hexahydrophthalic anhydride, and 232 parts of fumaric acid were charged and heated to 205° C. while blowing nitrogen gas. After reacting for 14 hours, 468 parts of a styrene monomer and 0.12 parts of hydroquinone were added to obtain an unsaturated polyester resin composition having a nonvolatile content of 70% and an acid value of 12. A cured article of such a composition showed a shrinkage stress upon cooling of 1.6 MPa and a ratio of shrinkage stress upon cooling/elastic limit of 0.14. As a result of the following weathering test, the gloss retention was 75%, and the color difference was 8.9.

Example 2

Preparation of Unsaturated Polyester Resin Composition

In a similar 2-liter four-necked flask to that of Example 1, 457 parts of neopentyl glycol, 51 parts of 1,3-propanediol, 70 parts of 2-butyl-2-ethyl-1,3-propanediol, 462 parts of hexahydrophthalic anhydride, and 232 parts of fumaric acid were charged and heated to 210° C., and then an esterification reaction was carried out. After reacting for 12 hours 483 parts of a styrene monomer and 0.13 parts of hydroquinone were added to obtain an unsaturated polyester resin composition having a nonvolatile content of 70% and an acid value of 9. To 100 parts of this unsaturated polyester resin, 0.5 parts of Tinuvin 400 (ultraviolet absorber, manufactured by Ciba Speciality Chemicals Inc.), 0.4 parts of Tinuvin 123 (ultraviolet absorber, manufactured by Ciba Speciality Chemicals Inc.), and 0.1 parts of LA-82 (ultraviolet absorber, manufactured by ASAHI DENKA KOGYO K.K.) were added to obtain an unsaturated polyester resin composition. A cured article of such a composition showed a shrinkage stress upon cooling of 7.3 MPa and a ratio of shrinkage stress upon cooling/elastic limit of 0.31. As a result of the following weathering test, the gloss retention was 95%, and the color difference was 3.1.

Example 3

Preparation of Unsaturated Polyester Resin Composition

In a similar 2-liter four-necked flask to that of Example 1, 417 parts of neopentyl glycol, 152 parts of 1,3-propanediol, 308 parts of hexahydrophthalic anhydride, and 464 parts of fumaric acid were charged and heated to 210° C., and then an esterification reaction was carried out. After reacting for 14 hours, 579 parts of a styrene monomer, 193 parts of methyl methacrylate, and 0.12 parts of hydroquinone were added to obtain an unsaturated polyester resin composition having a nonvolatile content of 60%, an acid value of 5, and a viscosity of 0.6 Pa·s. A cured article of such a composition showed a shrinkage stress upon cooling of 7.9 MPa and a ratio of shrinkage stress upon cooling/elastic limit of 0.71. As a result of the following weathering test, the gloss retention was 79%, and the color difference was 13.

Example 4

Preparation of Unsaturated Polyester Resin Composition

In a 2-liter four-necked flask equipped with a thermometer, a stirrer, an inert gas introducing inlet, and a reflux condenser, 335.3 parts of neopentyl glycol, 73.5 parts of 1,2-propylene glycol, 90 parts of 2,2-butyl-2-ethyl-1,3-propanediol, 433.4 parts of 1,4-cyclohexanedicarboxylic acid, and 209 parts of fumaric acid were charged and heated to 205° C. while blowing nitrogen gas. After reacting for 14 hours, 422 parts of a styrene monomer and 0.12 parts of hydroquinone were added to obtain an unsaturated polyester resin composition having a nonvolatile content of 70% and an acid value of 12. To this a composition, 758.1 parts of neopentyl glycol dimethacrylate as a polymerizable unsaturated monomer were added to obtain an unsaturated polyester resin composition. A cured article of such a composition showed a shrinkage stress upon cooling of 12.4 MPa and a ratio of shrinkage stress upon cooling/elastic limit of 0.67. As a result of the following weathering test, the gloss retention was 89%, and the color difference was 11.4.

Example 5

Preparation of Unsaturated Polyester Resin Composition

In a similar 2-liter four-necked flask to that of Example 1, 229 parts of neopentyl glycol, 297 parts of 2-methyl-1,3-propanediol, 308 parts of hexahydrophthalic anhydride, and 348 parts of fumaric acid were charged and heated to 210° C., and then an esterification reaction was carried out. After reacting for 12 hours, 445 parts of a styrene monomer and 0.12 parts of hydroquinone were added to obtain an unsaturated polyester resin composition having a nonvolatile content of 70% and an acid value of 12. To 100 parts of this unsaturated polyester resin, 0.5 parts of Tinuvin 400 (ultraviolet absorber, manufactured by Ciba Speciality Chemicals Inc.), 0.4 parts of Tinuvin 123 (ultraviolet absorber, manufactured by Ciba Speciality Chemicals Inc.), and 0.1 parts of LA-82 (ultraviolet absorber, manufactured by ASAHI DENKA KOGYO K.K.) were added to obtain an unsaturated polyester resin composition. A cured article of such a composition showed a shrinkage stress upon cooling of 10.1 MPa and a ratio of shrinkage stress upon cooling/elastic limit of 0.45. As a result of the following weathering test, the gloss retention was 85%, and the color difference was 13.7.

Example 6

Preparation of Unsaturated Polyester Resin Composition

In a similar 2-liter four-necked flask to that of Example 1, 458 parts of neopentyl glycol, 99 parts of 2-methyl-1,3-propanediol, 308 parts of hexahydrophthalic anhydride, and 294 parts of maleic anhydride were charged and heated to 210° C., and then an esterification reaction was carried out. After reacting for 14 hours, 486 parts of a styrene monomer and 0.11 parts of hydroquinone were added to obtain an unsaturated polyester resin composition having a nonvolatile content of 68% and an acid value of 14. A cured article of such a composition showed a shrinkage stress upon cooling of 7.4 MPa and a ratio of shrinkage stress upon cooling/elastic limit of 0.31. As a result of the following weathering test, the gloss retention was 78%, and the color difference was 11.4

Example 7

Preparation of Unsaturated Polyester Resin Composition

In a similar 2-liter four-necked flask to that of Example 1, 458 parts of neopentyl glycol, 84 parts of 1,3-propanediol, 462 parts of hexahydrophthalic anhydride, and 232 parts of fumaric acid were charged and heated to 210° C., and then an esterification reaction was carried out. After reacting for 14 hours, 522 parts of a styrene monomer and 0.12 parts of hydroquinone were added to obtain an unsaturated polyester resin composition having a nonvolatile content of 68% and an acid value of 11. A cured article of such a composition showed a shrinkage stress upon cooling of 9.1 MPa and a ratio of shrinkage stress upon cooling/elastic limit of 0.55. As a result of the following weathering test, the gloss retention was 73%, and the color difference was 14.2.

Example 8

Preparation of Unsaturated Polyester Resin Composition

In a 2-liter four-necked flask equipped with a thermometer, a stirrer, an inert gas introducing inlet, and a reflux condenser, 458 parts of neopentyl glycol, 99 parts of 2-methyl-1,3-propanediol, 308 parts of hexahydrophthalic anhydride, and 348 parts of fumaric acid were charged and heated to 210° C. After reacting for 14 hours, 503 parts of a styrene monomer, and 0.11 parts of hydroquinone were added to obtain an unsaturated polyester resin composition having a nonvolatile content of 68% and an acid value of 12. A cured article of such a composition showed a shrinkage stress upon cooling of 11.7 MPa and a ratio of shrinkage stress upon cooling/elastic limit of 0.55. As a result of the following weathering test, the gloss retention was 67%, and the color difference was 14.5.

Example 9

Preparation of Unsaturated Polyester Resin Composition

In a similar 2-liter four-necked flask to that of Example 1, 278 parts of neopentyl glycol, 90 parts of 2-methyl-1,3-propanediol, 111 parts of isophthalic acid, 44 parts of adipic acid, 103 parts of hexahydrophthalic anhydride, and 197 parts of fumaric acid were charged and heated to 210° C., and then an esterification reaction was carried out. After reacting for 12 hours, 279 parts of a styrene monomer and 0.05 parts of hydroquinone were added to obtain an unsaturated polyester resin composition having a nonvolatile content of 70% and an acid value of 12. A cured article of such a composition showed a shrinkage stress upon cooling of 6 MPa and a ratio of shrinkage stress upon cooling/elastic limit of 0.25. As a result of the following weathering test, the gloss retention was 66%, and the color difference was 13.7.

Comparative Example 1

Preparation of Unsaturated Polyester Resin Composition

In the same manner as in Example 1, 416 parts of neopentyl glycol, 152 parts of 1,2-propylene glycol, 332 parts of isophthalic acid, and 464 parts of fumaric acid were charged and heated to 210° C., and then an esterification reaction was carried out. After reacting for 14 hours, 939 parts of a styrene monomer and 0.12 parts of hydroquinone were added to obtain an unsaturated polyester resin composition having a nonvolatile content of 55% and an acid value of 5. A cured article of such a composition showed a shrinkage stress upon cooling of 29.6 MPa and a ratio of shrinkage stress upon cooling/elastic limit of 1.31. As a result of the following weathering test, a gloss retention (1,500 hours) was 60%, and a color difference was 20.4.

Comparative Example 2

Preparation of Unsaturated Polyester Resin Composition

In the same manner as in Example 1, 208 parts of neopentyl glycol, 76 parts of 1,2-propylene glycol, 154 parts of hexahydrophthalic anhydride, and 196 parts of maleic anhydride were charged and heated to 210° C., and then an esterification reaction was carried out. After reacting for 14 hours, 410 parts of a styrene monomer and 0.06 parts of hydroquinone were added to obtain an unsaturated polyester resin composition having a nonvolatile content of 60% and an acid value of 5. A cured article of such a composition showed a shrinkage stress upon cooling of 20.6 MPa and a ratio of shrinkage stress upon cooling/elastic limit of 0.72. As a result of the following weathering test, a gloss retention (1,500 hours) was 40%, and a color difference was 15.

Comparative Example 3

Preparation of Unsaturated Polyester Resin Composition

In the same manner as in Example 1, 406 parts of 2-methyl-1,3-propanediol, 444 parts of phthalic anhydride, and 147 parts of maleic anhydride were charged and heated to 210° C., and then an esterification reaction was carried out. After reacting for 14 hours, 610.9 parts of a styrene monomer and 0.06 parts of hydroquinone were added to obtain an unsaturated polyester resin composition having a nonvolatile content of 60% and an acid value of 7. As a result of the following weathering test, a shrinkage stress upon cooling could not be measured because a gloss retention (1,500 hours) of a cured article of such a composition was 29%.

Test Examples

Using the resulting unsaturated polyester resin compositions, the following tests were carried out. The results are summarized in Table 1 and Table 2.

<Shrinkage Stress Upon Cooling>

The shrinkage stress upon cooling from 70° C. to 20° C. was measured by the method described above using the resin compositions of the Examples and the Comparative Examples.

<Weathering Test Using a Sunshine Weatherometer.

(1) Production of Test Plate

Each of the resin compositions to be used was prepared by adding 1.0% of 55% methyl ethyl ketone peroxide and 0.1% of 6% cobalt naphthenate to each of the unsaturated polyester resin compositions obtained in the Examples and the Comparative Examples, followed by stirring and degassing. A releasant (Frekote FRP, manufactured by F-REKOTE Inc.) was applied to a glass plate, and a spacer for controlling the thickness was placed thereon. The resin composition was poured onto the glass plate, allowed to stand at a normal temperature for 24 hours and then cured at 120° C. for 120 minutes to obtain a cast test plate having a thickness of about 3 mm.

(2) Weathering Test

Weathering test pieces having a size of 75 mm×70 mm were made by cutting the test plate obtained by Method (1). Using a Sunshine weatherometer (WEL-SUN-HCH-B type, manufactured by SUGA TEST INSTRUMENTS CO., LTD.), an accelerated weathering test was carried out.

Test Conditions:

Temperature: 63±3° C.

Cycle: rainfall for 18 minutes out of 120 minutes

Time: 2,000 hours

With respect to test pieces wherein drastic lowering of gloss was recognized by visual observation every 250 hours, the test was stopped.

(3) Evaluation of Weathering Resistance

The gloss and color difference of each test piece after the test were measured. A gloss meter "Model GM26D, manufactured by MURAKAMI COLOR RESEARCH LABORATORY" was used as the measuring device. The measuring angle was 60°. The gloss retention was determined by the formula "(specular gloss after test/specular gloss before test)×100".

The color difference was measured with a projecting pipe (specimen support) of 30ø, using a Z1001DP manufactured by NIPPON DENSHOKU CO., LTD., and a ΔE value was used as the "value of the color difference". The larger the value, the more severe is the degree of yellowing.

<Measurement of Elastic Limit>

The elastic limit of the resin compositions of the Examples and the Comparative Examples was measured by the measuring method described above.

TABLE 1

|  | Example 1 | Example 2 | Example 3 | Example 4 | Example 5 | Comp. Example 1 |
| --- | --- | --- | --- | --- | --- | --- |
| Neopentyl glycol | 366 | 457 | 417 | 335.3 | 229 | 416 |
| Ethylene glycol | 88 | — | — | — | — | — |
| 1,3-propanediol | — | 51 | 152 | — | — | — |
| 2-butyl-2-ethyl-1,3-butanediol | 88 | 70 | — | 90 | — | — |
| 2-methyl-1,3-propanediol | — | — | — | — | 297 | — |
| 1,2-propylene glycol | — | — | — | 73.5 | — | 152 |
| Hexahydrophthalic anhydride | 462 | 462 | 308 | — | 308 | — |
| 1,4-cyclohexanedicarboxylic acid | — | — | — | 433.4 | — | — |
| Fumaric acid | 232 | 232 | 464 | 209 | 348 | 464 |
| Isophthalic acid | — | — | — | — | — | 332 |
| Neopentyl glycol dimethacrylate | — | — | — | 758.1 | — | — |
| Styrene monomer | 468 | 483 | 579 | 422 | 445 | 939 |
| Methyl methacrylate | — | — | 193 | — | — | — |
| Nonvolatile content (%) | 70 | 70 | 60 | 70 | 70 | 55 |
| Polymerizable unsaturated monomer (%) | 30 | 30 | 40 | 30 | 30 | 45 |
| Shrinkage stress upon cooling | 1.6 | 7.3 | 7.9 | 12.4 | 10.1 | 29.6 |
| Ratio of shrinkage stress upon cooling/elastic limit | 0.14 | 0.31 | 0.71 | 0.67 | 0.45 | 1.31 |
| Gloss retention (2,000 hours) | 75 | 95 | 79 | 89 | 85 | 60(1,500) |
| Color difference (2,000 hours) | 8.9 | 3.1 | 13 | 11.4 | 13.7 | 20.4 |

TABLE 2

|  | Example 6 | Example 7 | Example 8 | Example 9 | Comp. Example 2 | Comp. Example 3 |
|---|---|---|---|---|---|---|
| Neopentyl glycol | 458 | 458 | 458 | 278 | 208 | — |
| 1,3-propanediol | — | 84 | — | — | — | — |
| 2-methyl-1,3-propanediol | 99 | — | 99 | 90 | — | 406 |
| 1,2-propylene glycol | — | — | — | — | 76 | — |
| Hexahydrophthalic anhydride | 308 | 462 | 308 | 103 | 154 | — |
| Adipic acid | — | — | — | 44 | — | — |
| Fumaric acid | — | 232 | 348 | 197 | — | — |
| Maleic anhyride | 294 | — | — | — | 196 | 147 |
| Isophthalic acid | — | — | — | 111 | ‘ | — |
| Phthalic anhydride | — | — | — | — | — | 444 |
| Styrene monomer | 486 | 522 | 503 | 279 | 410 | 610 |
| Nonvolatile content (%) | 68 | 68 | 68 | 70 | 60 | 60 |
| Polymerizable unsaturated monomer (%) | 32 | 32 | 32 | 30 | 40 | 40 |
| Shrinkage stress upon cooling | 7.4 | 9.1 | 11.7 | 6 | 20.6 | — |
| Ratio of shrinkage stress upon cooling/elastic limit | 0.31 | 0.55 | 0.51 | 0.25 | 0.72 | — |
| Gloss retention (2,000 hours) | 78 | 73 | 67 | 66 | 40(1,500) | 29(1,500) |
| Color difference (2,000 hours) | 11.4 | 14.2 | 14.5 | 13.7 | 15.0(1,500) | 15.0(1,500) |

(Production of Fiber Reinforced Plastic Molded Article)

To confirm the weathering resistance of the FRP molded article comprising a surface layer made of the unsaturated polyester resin composition of the present invention, a gel coating laminated plate was made by the following method.

First, a releasant (Bonrease, manufactured by KOSHIN CHEMICAL CO., LTD.) was applied to the glass plate, and then 1.0% of 55% methyl ethyl ketone peroxide and 5 parts of 0.6% cobalt naphthenate were added to 100 parts of each of the resin compositions of the Examples and the Comparative Examples, followed by stirring. The mixture was spray-coated on the glass plate, allowed to stand at a normal temperature for one hour and further cured at 60° C. for 30 minutes. Using a glass chop strand mat (weight: 450 g/m$^2$, (M)), a glass roving cloth (570 g/m$^2$, (R)), and a resin for lamination (unsaturated polyester resin manufactured by DAINIPPON INK & CHEMICALS, INC., trade name POLYLITE FH-286), glass fiber reinforcers (M)+(R)+(M) were laminated and molded at one time so as to be laid one upon another at the L-shaped corner portion. As the resin for lamination, 2 parts of 0.6% cobalt naphthenate and 1.0 part of 55% methyl ethyl ketone peroxide were used. The resulting laminate was allowed to stand at a normal temperature for 18 hours, and an FRP molded article was peeled off from the glass plate to obtain a test plate. Weathering test pieces having a size of 50 mm×70 mm were made by cutting the test plate. In the same manner as described above, a Sunshine weatherometer (WEL-SUN-HCH-B type, manufactured by SUGA TEST INSTRUMENTS CO., LTD.) was used in the weathering test.

Test Conditions:

Temperature: 63±3° C.

Cycle: rainfall for 18 minutes out of 120 minutes

Time: 2,000 hours

With respect to test pieces wherein drastic lowering of gloss was recognized by visual observation every 250 hours, the test was stopped. The test results are shown in Table 3.

(3) Evaluation of Weathering Resistance

Evaluation was carried out by visual observation the degree of whitening of the surface.

Evaluation:

⊙: no whitening
○: some whitening
X: whitening

TABLE 3

|  | Example 1 | Example 2 | Comp. Example 1 |
|---|---|---|---|
| Weathering resistance | ⊙ | ⊙ | X |

INDUSTRIAL APPLICABILITY

The unsaturated polyester resin composition of the present invention is capable of forming a cured article having excellent gloss retention and yellowing resistance by controlling the "shrinkage stress upon cooling" of the cured article to 17 MPa or less and the ratio of the "shrinkage stress upon cooling/elastic limit" to 1 or less. Moreover, it is made possible to provide a coating material and a molded article, which have a mechanical strength suited for various uses and characteristics capable of preventing cracks caused by a repetitive change in stress produced as a result of a change in temperature, that is, heating and cooling. Also the content and vaporization of the polymerizable unsaturated monomer can be reduced by specifying the content of the monomer.

The unsaturated polyester resin composition of the present invention is suited for use in coating materials such as coating compositions, lining materials, and gel coating materials, and various molded articles such as FRP molding materials, because the cured article thereof has excellent gloss retention and yellowing resistance.

What is claimed is:

1. An unsaturated polyester resin composition comprising an unsaturated polyester (A) and a polymerizable unsaturated monomer (B), the unsaturated polyester (A) derived from a dibasic acid component and a polyhydric alcohol component, wherein the dibasic acid component comprises 30 to 65 mol % of an alicyclic saturated dibasic acid and 35 to 70 mol % of an aliphatic unsaturated dibasic acid, and the polyhydric alcohol component comprises 40 to 80 mol % of a symmetric glycol and 20 to 60 mol % of an asymmetric glycol having a side chain, or the dibasic acid component comprises 30 to 65 mol % of an alicyclic saturated dibasic acid and 35 to 70 mol % of an aliphatic unsaturated dibasic acid, and the polyhydric alcohol component comprises 60 to 80 mol % of a symmetric glycol, 10 to 35 mol % of a glycol having no side chain, and 5 to 10 mol % of an asymmetric glycol having a side chain, and wherein the "shrinkage stress upon cooling" of cured article thereof is 17 Mpa or less and a ratio of the "shrinkage stress upon cooling/elastic limit" is 1 or less.

2. An unsaturated polyester resin composition according to claim 1, wherein the gloss retention of a cured article thereof is 60% or more.

3. An unsaturated polyester resin composition according to claim 1, wherein the gloss retention of a cured article thereof is 60% or more and the color difference is 20 or less.

4. An unsaturated polyester resin composition according to claim 1, wherein the alicyclic saturated dibasic acid comprises at least one selected from the group consisting of hexahydrophthalic anhydride and an anhydride and ester derivative thereof, the symmetric glycol is neopentyl glycol, the glycol having no side chain is at least one selected from ethylene glycol and 1,3-propanediol, and the asymmetric glycol having a side chain comprises at least one selected from the group consisting of 1-butyl-2-ethyl-1,3-propanediol, 2-methyl-1,4-butanediol, 2-ethyl-1,4-butanediol, 2-methyl-1,3-propanediol, and 3-methyl-1,5-pentanediol.

5. A coating material using the unsaturated polyester resin composition of claim 1.

6. A gel coating material using the unsaturated polyester resin composition of claim 1.

7. A fiber reinforced plastic molded article comprising a surface layer made of a cured article of the unsaturated polyester resin composition of claim 1.

* * * * *

UNITED STATES PATENT AND TRADEMARK OFFICE
CERTIFICATE OF CORRECTION

PATENT NO. : 6,808,821 B2
DATED : October 26, 2004
INVENTOR(S) : Fujita et al.

It is certified that error appears in the above-identified patent and that said Letters Patent is hereby corrected as shown below:

Column 18,
Line 5, change "1 - butyl - 2 - ethyl - 1, 3 -" to be -- 2 - butyl - 2 - ethyl - 1, 3 - --

Signed and Sealed this

Tenth Day of May, 2005

JON W. DUDAS
*Director of the United States Patent and Trademark Office*